(12) United States Patent
Hyp et al.

(10) Patent No.: US 6,761,278 B2
(45) Date of Patent: Jul. 13, 2004

(54) AMBIDEXTROUS CONSOLE LID

(75) Inventors: Eric D. Hyp, Aspers, PA (US); John Andrew Erikson, Dillsburg, PA (US)

(73) Assignee: Southco, Inc., Concordville, PA (US)

( * ) Notice: Subject to any disclaimer, the term of this patent is extended or adjusted under 35 U.S.C. 154(b) by 13 days.

(21) Appl. No.: 10/136,751

(22) Filed: Apr. 30, 2002

(65) Prior Publication Data

US 2003/0038496 A1 Feb. 27, 2003

Related U.S. Application Data

(60) Provisional application No. 60/287,664, filed on Apr. 30, 2001.

(51) Int. Cl.$^7$ ............................. B65D 43/16; B60R 7/04
(52) U.S. Cl. ................................ 220/254.2; 220/254.3; 220/254.6; 220/259.2; 220/826; 220/835; 224/275; 296/37.8
(58) Field of Search .......................... 220/254.1, 254.2, 220/254.3, 254.6, 259.1, 259.2, 263, 264, 819, 826, 835, 324, 326; 224/275, 539, 542; 296/37.8, 37.1, 37.14; 297/188.19, 188.14

(56) References Cited

U.S. PATENT DOCUMENTS

| | | |
|---|---|---|
| 2,251,138 A | 7/1941 | Knight |
| 2,571,353 A | 10/1951 | Felsch |
| 3,050,322 A | 8/1962 | Miller |
| 3,100,980 A | 8/1963 | Humphries |
| 4,239,269 A | 12/1980 | Chiang |
| 4,306,431 A | 12/1981 | Craig |
| 4,503,582 A | 3/1985 | Gurubatham |
| 4,676,081 A | 6/1987 | Craig |
| 4,736,649 A | 4/1988 | Beun |
| 4,799,503 A | 1/1989 | Tahara |
| 4,893,850 A | 1/1990 | Mizusawa |
| 4,895,401 A | 1/1990 | Thornton et al. |
| 4,962,800 A | 10/1990 | Owiriwo |
| 4,964,526 A | 10/1990 | Stephens |
| 5,076,641 A * | 12/1991 | Lindberg ............... 297/188.19 |

(List continued on next page.)

FOREIGN PATENT DOCUMENTS

JP         7-215133      * 8/1995

OTHER PUBLICATIONS

Photograph of Q–45 Latch Pass Open, undated.
Photograph of Q–45 Latch Driver Open, undated.
Photograph of Q–45 Latch Driver Close–Up, undated.
Photograph of Q–45 Latch Front Close Up, undated.
Photograph of Q–45 Latch Driver Unlatched, undated.
Photograph of Q–45 Latch Driver Close Up Latched, undated.
Photograph of Q–45 Latch Driver Close Up Unlatched, undated.
Photograph of Q–45 Latch Closed—No Lid, undated.

*Primary Examiner*—Nathan J. Newhouse
(74) *Attorney, Agent, or Firm*—Paul & Paul

(57) ABSTRACT

An ambidextrous lid assembly that allows a lid to be opened from either side of a compartment is disclosed. The lid assembly includes at least a first frame member adapted to be pivotally attached proximate the compartment opening. The first frame member has an opening that allows access therethrough to at least a portion of the interior of the compartment when the first frame member is closed against the perimeter of the compartment opening. The lid assembly includes a second frame member that is pivotally attached to the first frame member and either by itself or in cooperation with a lid cover provides a closure for the opening in the first frame member. The first frame member carries a latch for securing it about the opening, and the second frame member carries a latch for securing it to the first frame member.

7 Claims, 11 Drawing Sheets

U.S. PATENT DOCUMENTS

| | | |
|---|---|---|
| 5,187,836 A | 2/1993 | Kim et al. |
| 5,195,272 A | 3/1993 | Yamada |
| 5,212,849 A * | 5/1993 | Aihara ............... 16/DIG. 23 |
| 5,337,911 A * | 8/1994 | Holub ................. 220/254.3 |
| 5,357,652 A | 10/1994 | Yamada |
| 5,390,516 A | 2/1995 | Alchin |
| 5,548,927 A | 8/1996 | Song |
| 5,551,737 A | 9/1996 | Clavin |
| 5,647,652 A * | 7/1997 | Zalewski et al. ........... 224/539 |
| 5,689,980 A | 11/1997 | Weinerman et al. |
| 5,785,398 A | 7/1998 | Park |
| 5,829,197 A | 11/1998 | Oh |
| 5,863,089 A | 1/1999 | Ignarra et al. |
| 5,868,478 A | 2/1999 | Yemini |
| 5,878,878 A | 3/1999 | Wu |
| 5,983,453 A | 11/1999 | Miwa |
| 6,003,716 A | 12/1999 | Allison et al. |
| 6,129,400 A * | 10/2000 | Jakubiec et al. ............ 224/275 |
| 6,142,333 A | 11/2000 | Sasamoto et al. |
| 6,234,546 B1 | 5/2001 | Asakura et al. |

\* cited by examiner

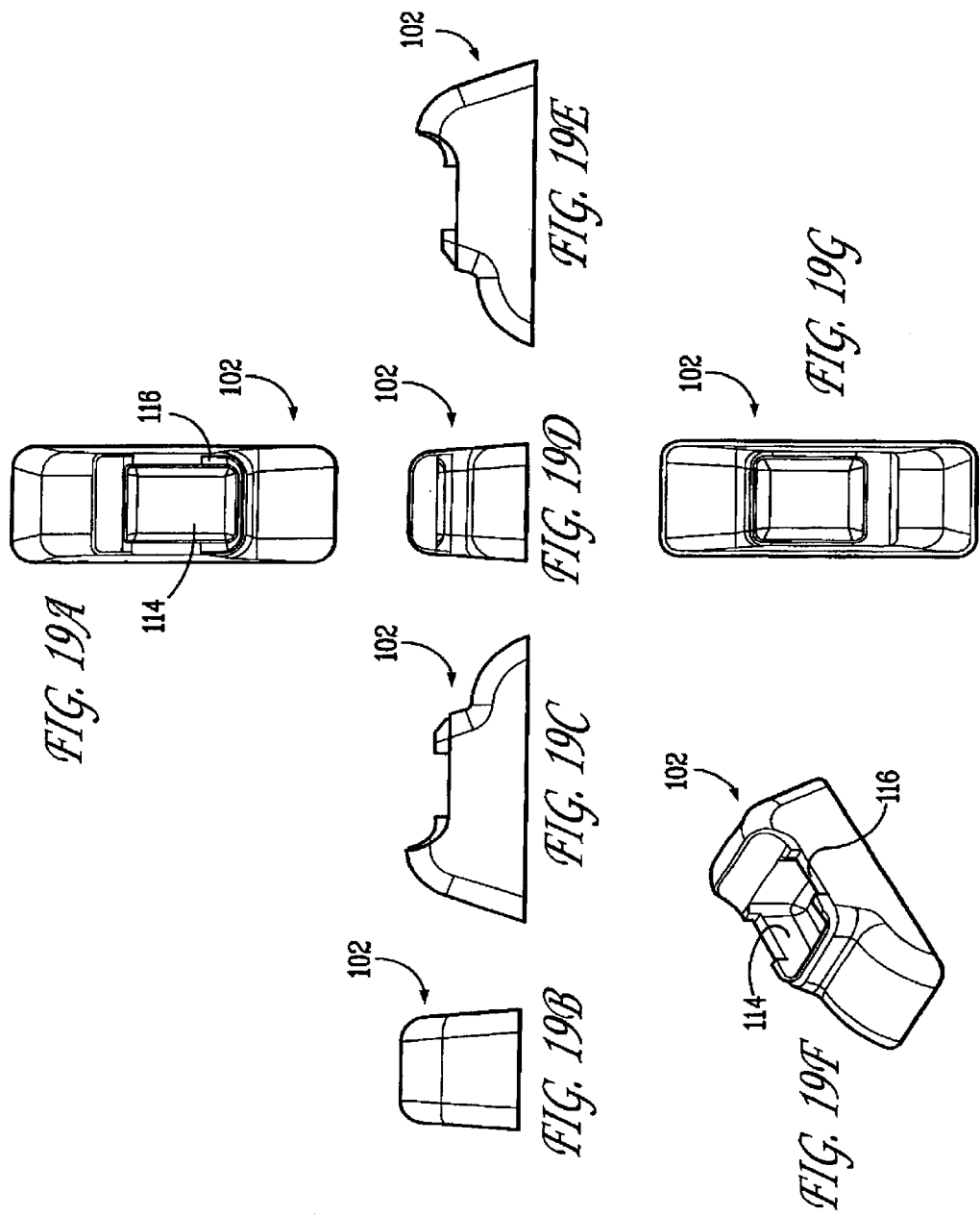

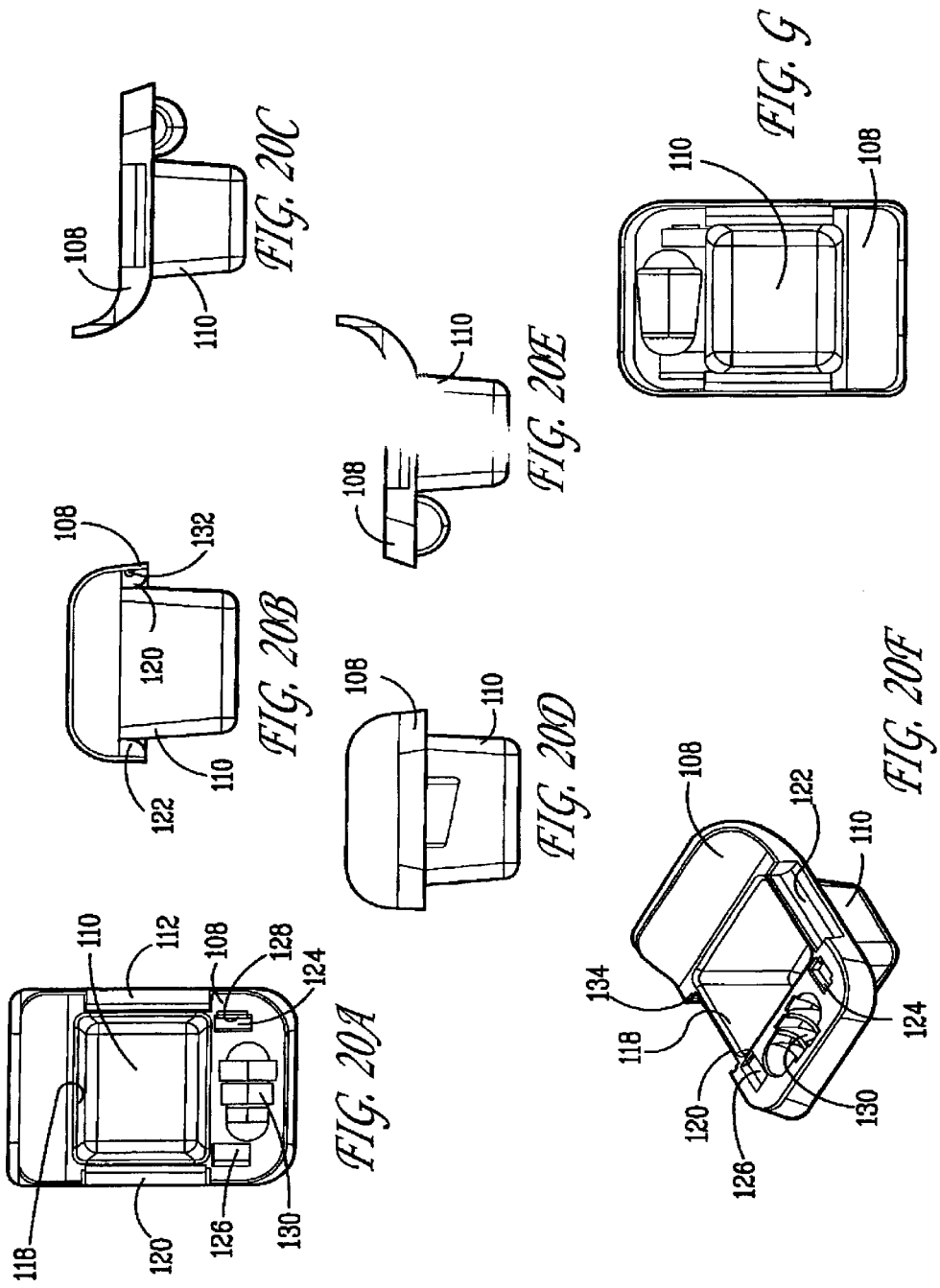

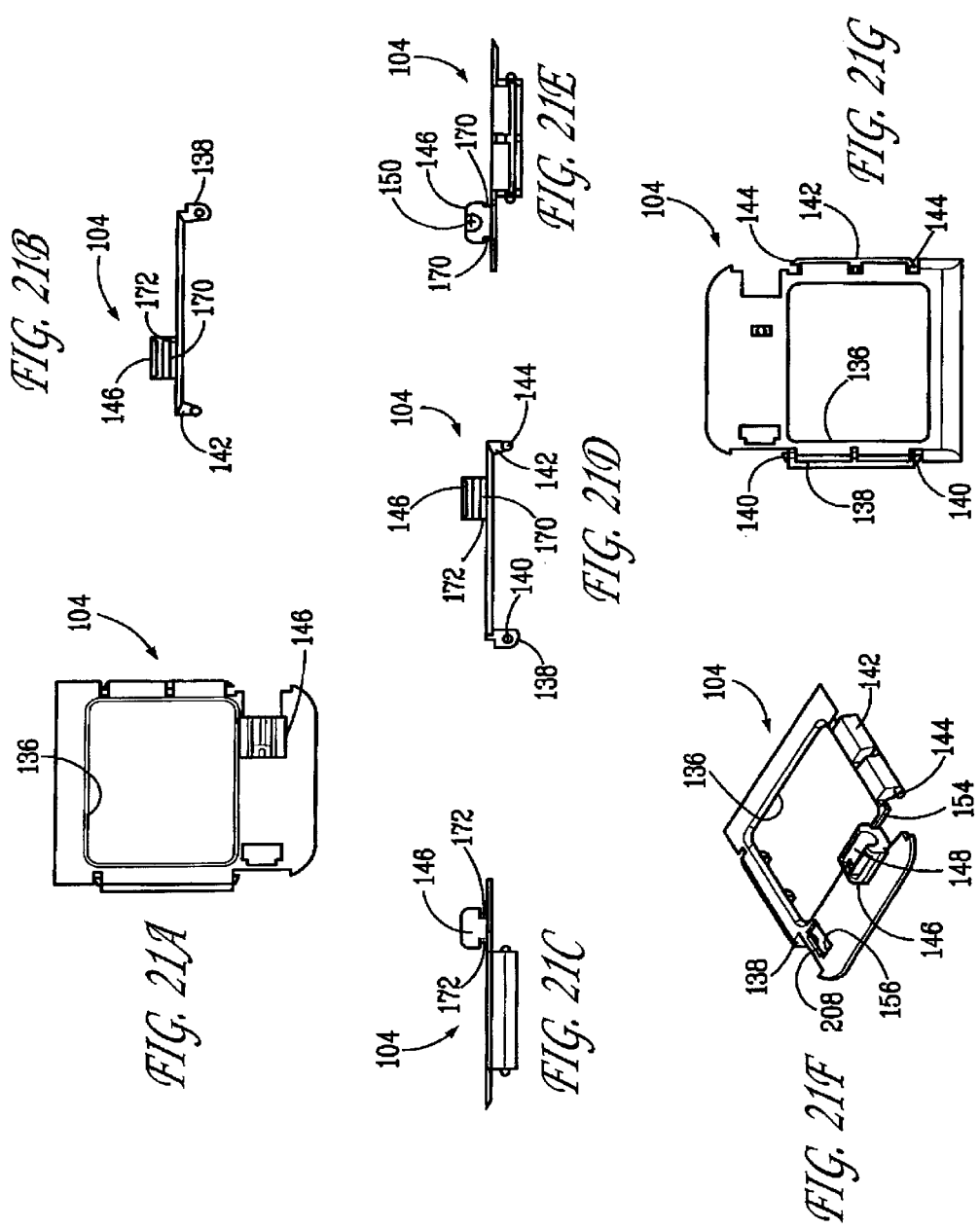

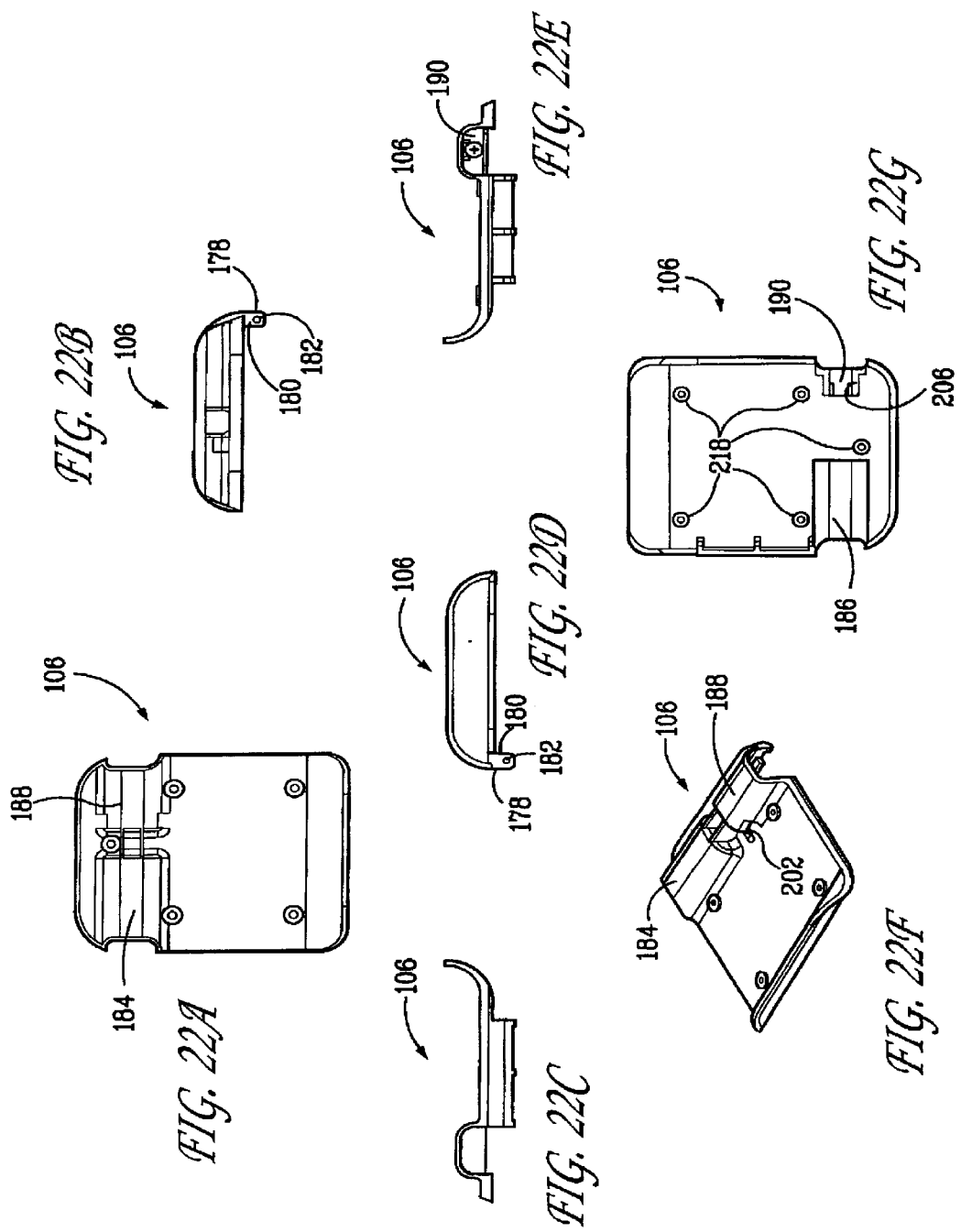

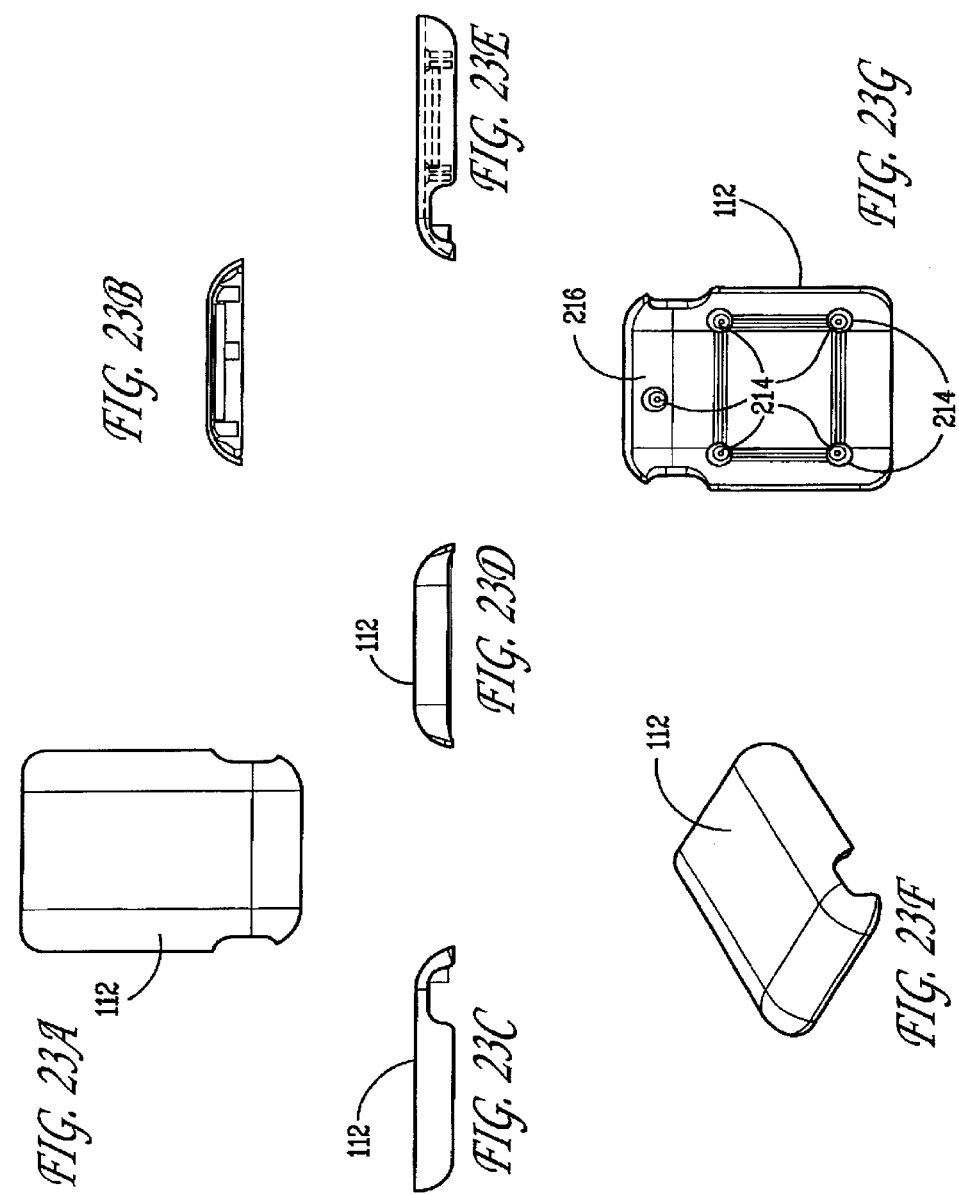

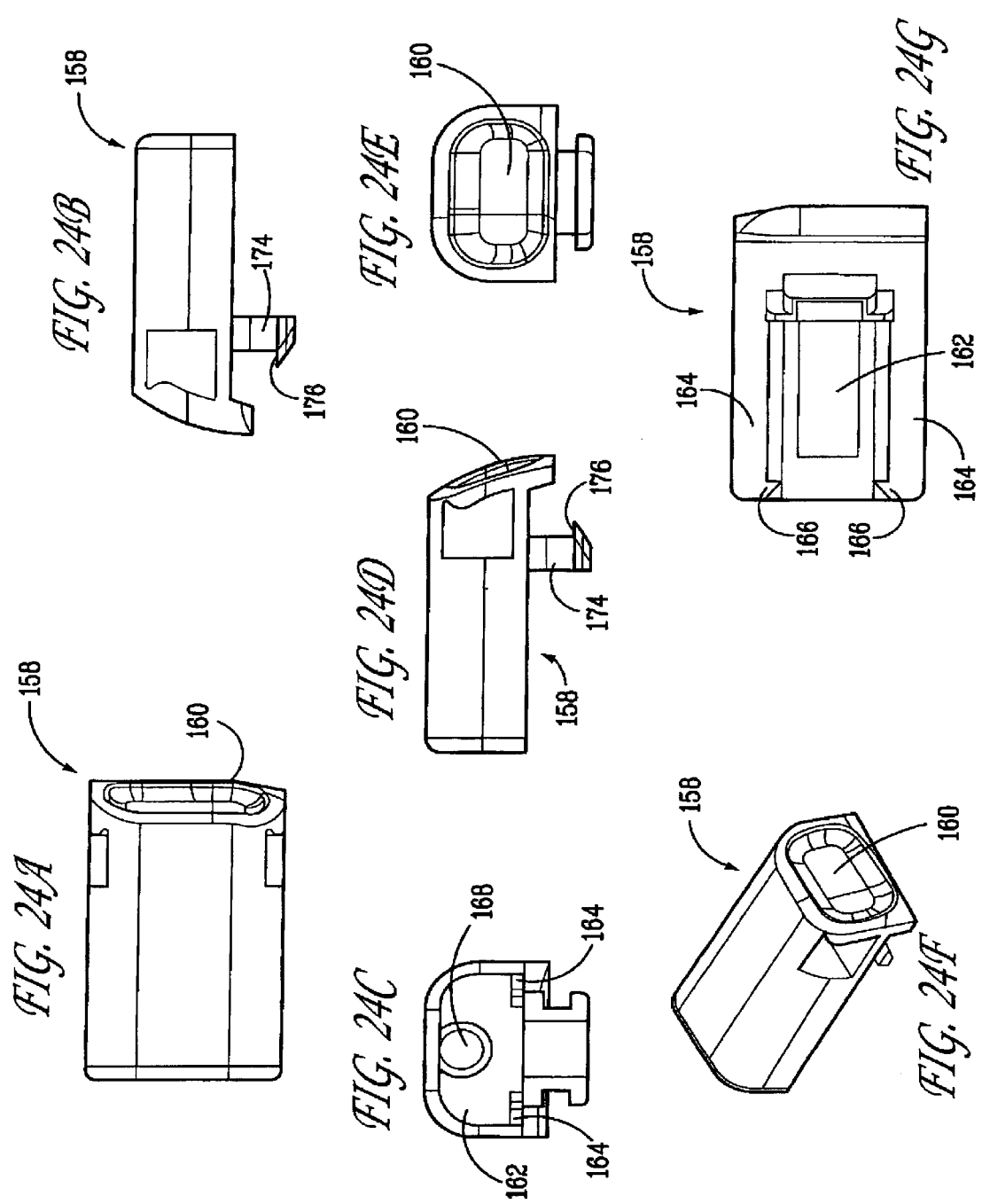

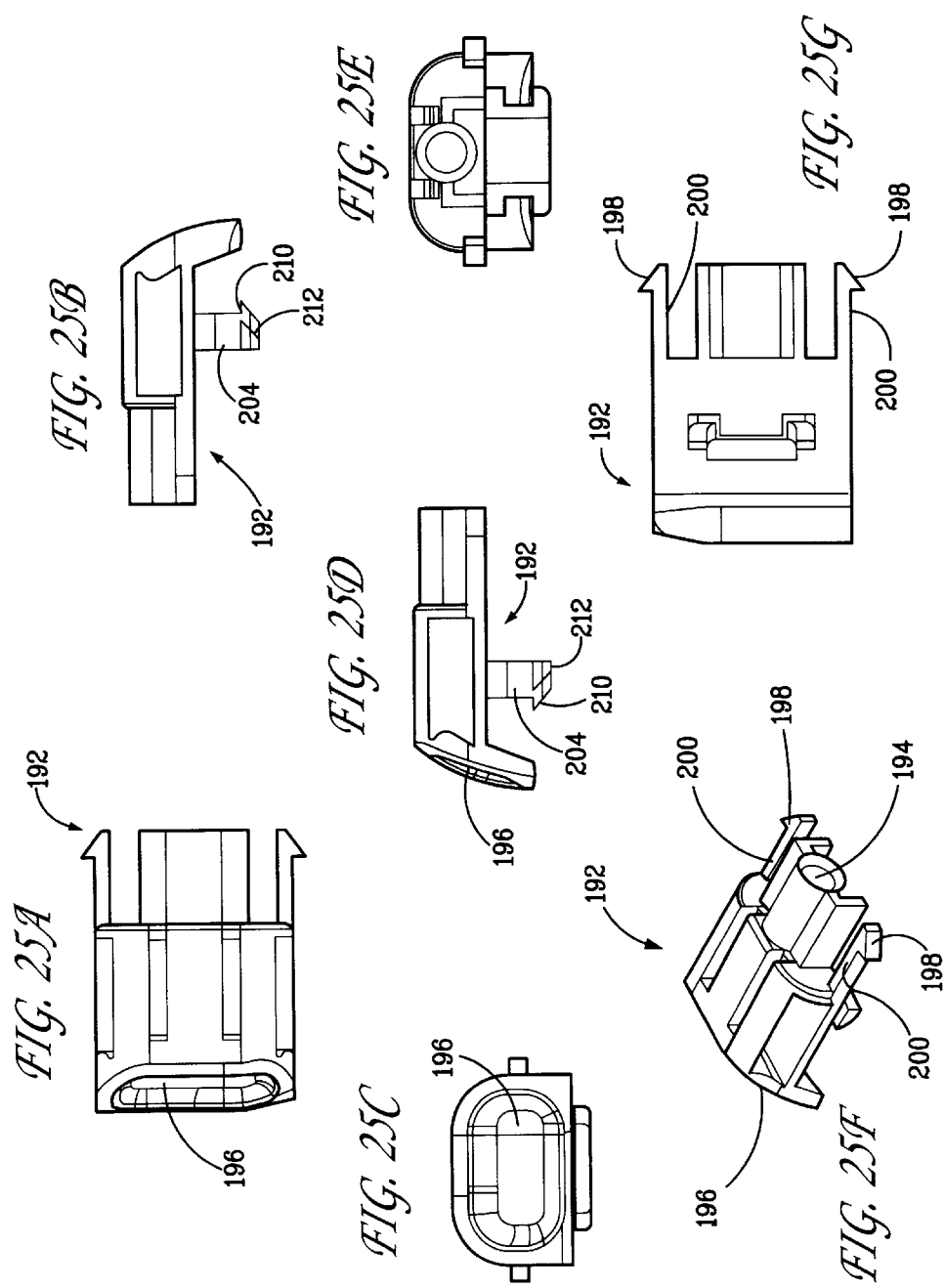

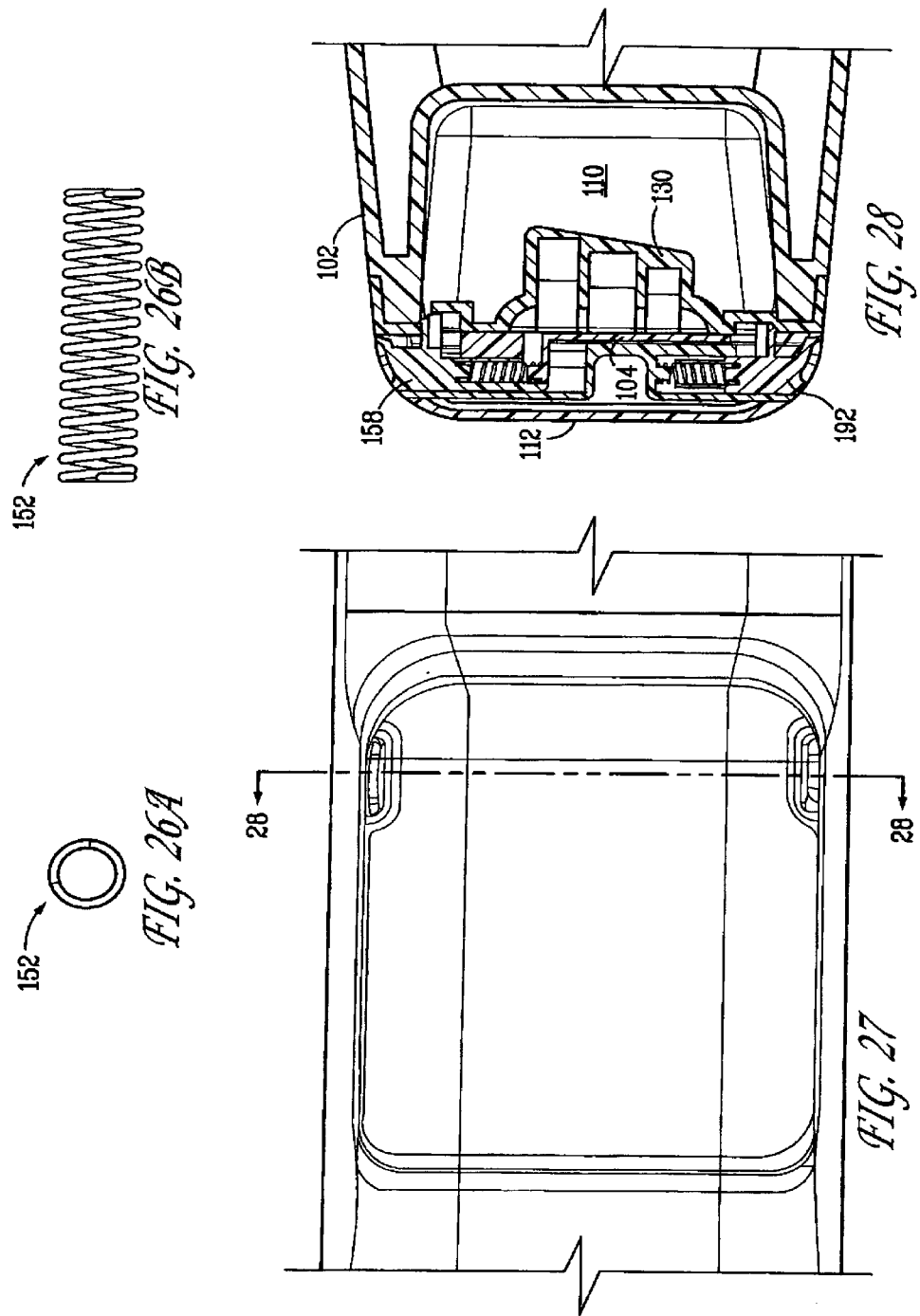

AMBIDEXTROUS CONSOLE LID

CROSS-REFERENCE TO RELATED APPLICATIONS

This application claims the benefit of the priority of U. S. Provisional Application for Patent Serial No. 60/287,664, filed on Apr. 30, 2001.

BACKGROUND OF THE INVENTION

1. Field of the Invention

The present invention relates to a lid assembly that functions as a closure for a compartment or the like.

2. Background and Description of the Prior Art

In many applications it may be desirable to allow a closure member such as a door or lid to be opened from either side of the compartment closed by the closure member. For example, consider the bin in the console of a vehicle such as a passenger car or sports utility vehicle. Such bins are normally located between the driver's seat and the front passenger's seat. Further such bins are usually provided with cushioned lids that also act as arm rests. The top opening of the bin would then have one side which is located closest to the passenger's seat and one side which is located closest to the driver's seat. If the lid is hinged on the passenger's side, then the driver can open the lid and readily view the contents of the bin, but the lid will obstruct the passenger's view and the passenger's access to the contents of the bin. Similarly, If the lid is hinged on the driver's side, then the passenger can open the lid and readily view the contents of the bin, but the lid will obstruct the driver's view and the driver's access to the contents of the bin.

One solution has been to hinge the lid at the rearmost side of the bin opening such that the lid swings toward the rear of the passenger compartment when the lid is being opened. This solution has not been entirely satisfactory. One drawback of this solution is that the usually elongated lid has to swing through a very large arc and, therefore, may interfere with other objects in the passenger compartment. Another drawback is that once the lid is opened, the lid is positioned between the backs of the front seats and is therefore difficult to reach by the occupants of the front seats. The need exists in the art for a special lid which can selectively swing to either side of the opening of a compartment.

SUMMARY OF THE INVENTION

The present invention is directed to an ambidextrous lid assembly that allows a lid to be opened from either side of a compartment. The lid assembly includes at least a first frame member adapted to be pivotally attached proximate the compartment opening. The first frame member has an opening that allows access therethrough to at least a portion of the interior of the compartment when the first frame member is closed against the perimeter of the compartment opening. The lid assembly includes a second frame member that is pivotally attached to the first frame member and either by itself or in cooperation with a lid cover provides a closure for the opening in the first frame member. The first frame member carries a latch for securing it about the opening, and the second frame member carries a latch for securing it to the first frame member.

Accordingly, it is a principal object of the invention to provide a lid assembly that can be selectively swung to either side of the opening of a compartment to allow access to the interior of the compartment.

Still another object of the invention is to provide a lid assembly that allows users positioned on either side of a compartment access to different portions of the compartment.

Yet another object of the invention is to provide an ambidextrous lid assembly which is cost-effective and fully effective for its intended purposes.

These and other objects of the present invention will become readily apparent upon further review of the following specification and drawings.

BRIEF DESCRIPTION OF THE DRAWINGS

FIGS. 19A–19G are views of a center console of a vehicle usable with the ambidextrous lid assembly of the present invention.

FIGS. 20A–20G are views of a combination compartment opening frame and container defining the compartment cavity, which may be used as part of the ambidextrous lid assembly of the present invention.

FIGS. 21A–21G are views of the first pivotal frame member of the ambidextrous lid assembly of the present invention.

FIGS. 22A–22G are views of the second pivotal frame member of the ambidextrous lid assembly of the present invention.

FIGS. 23A–23G are views of a lid cover usable with the ambidextrous lid assembly of the present invention.

FIGS. 24A–24G are views of the left button or latching member of the ambidextrous lid assembly of the present invention.

FIGS. 25A–25G are views of the right button or latching member of the ambidextrous lid assembly of the present invention.

FIGS. 26A–26B are views of one of a pair of springs used to bias the left and right buttons or latching members of the ambidextrous lid assembly of the present invention.

FIG. 27 is a top fragmentary environmental view of a center console of a vehicle using the ambidextrous lid assembly of the present invention, showing the ambidextrous lid assembly in the closed configuration.

FIG. 28 is a cross-sectional view, taken along line 28—28 of FIG. 27, of a center console of a vehicle using the ambidextrous lid assembly of the present invention, showing the ambidextrous lid assembly in the closed configuration.

Similar reference characters denote corresponding features consistently throughout the attached drawings.

DETAILED DESCRIPTION OF THE PREFERRED EMBODIMENTS

Figure 1:
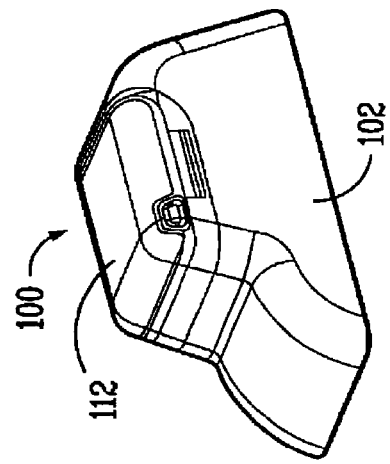
FIG. 1 is a right perspective view of a center console of a vehicle using the ambidextrous lid assembly of the present invention, showing the ambidextrous lid assembly in the closed configuration.
Figure 3:
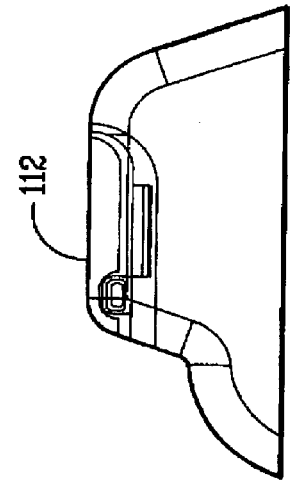
FIG. 3 is a left perspective view of a center console of a vehicle using the ambidextrous lid assembly of the present invention, showing the ambidextrous lid assembly in the closed configuration.
Figure 2:
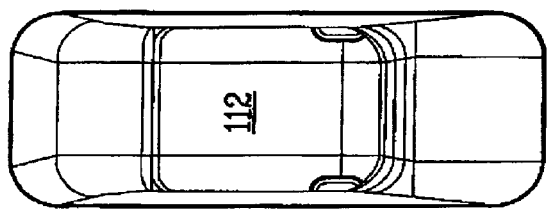
FIG. 2 is a top view of a center console of a vehicle using the ambidextrous lid assembly of the present invention, showing the ambidextrous lid assembly in the closed configuration.
Figure 5:
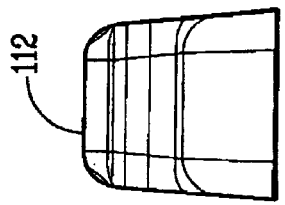
FIG. 5 is a front view of a center console of a vehicle using the ambidextrous lid assembly of the present invention, showing the ambidextrous lid assembly in the closed configuration.
Figure 4:
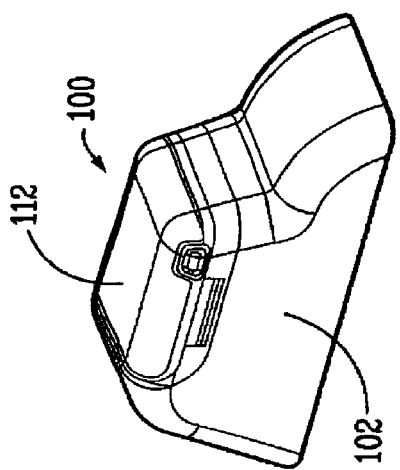
FIG. 4 is a right side view of a center console of a vehicle using the ambidextrous lid assembly of the present invention, showing the ambidextrous lid assembly in the closed configuration.
Figure 6:
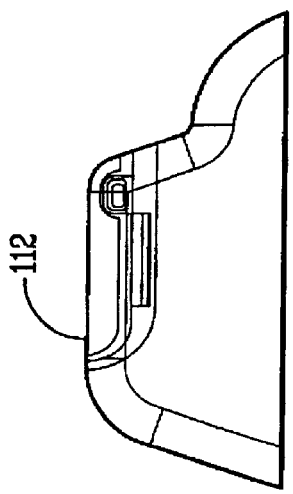
FIG. 6 is a left side view of a center console of a vehicle using the ambidextrous lid assembly of the present invention, showing the ambidextrous lid assembly in the closed configuration.
Figure 7:
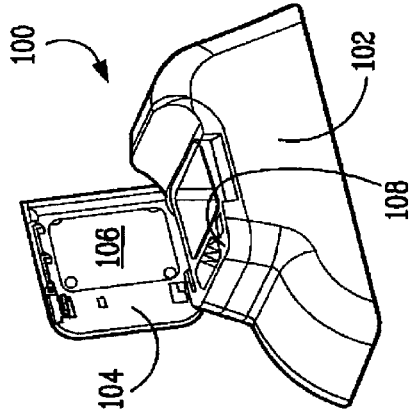
FIG. 7 is a right perspective view of a center console of a vehicle using the ambidextrous lid assembly of the present invention, showing the ambidextrous lid assembly opened from the left or driver's side.
Figure 10:
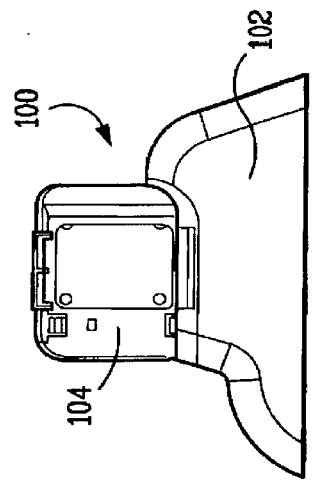
FIG. 10 is a right side view of a center console of a vehicle using the ambidextrous lid assembly of the present invention, showing the ambidextrous lid assembly opened from the left or driver's side.
Figure 8:
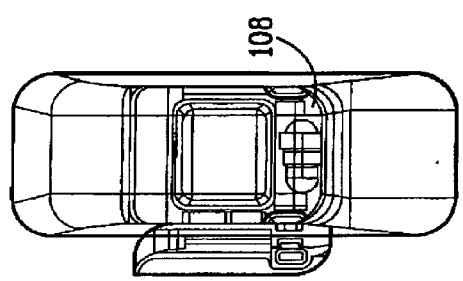
FIG. 8 is a top view of a center console of a vehicle using the ambidextrous lid assembly of the present invention, showing the ambidextrous lid assembly opened from the left or driver's side.
Figure 11:
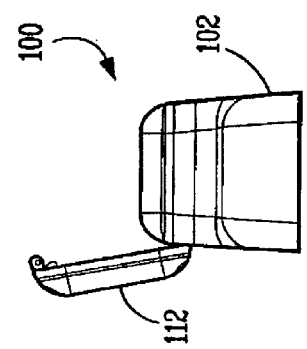
FIG. 11 is a front view of a center console of a vehicle using the ambidextrous lid assembly of the present invention, showing the ambidextrous lid assembly opened from the left or driver's side.
Figure 9:
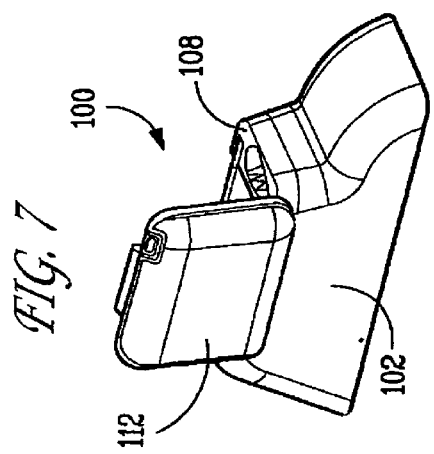
FIG. 9 is a left perspective view of a center console of a vehicle using the ambidextrous lid assembly of the present invention, showing the ambidextrous lid assembly opened from the left or driver's side.
Figure 12:
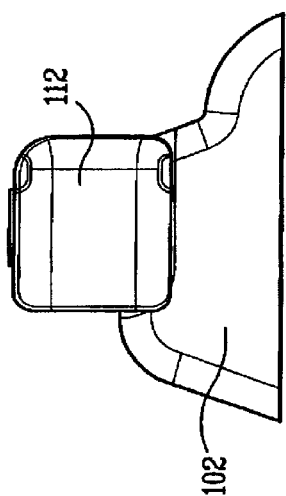
FIG. 12 is a left side view of a center console of a vehicle using the ambidextrous lid assembly of the present invention, showing the ambidextrous lid assembly opened from the left or driver's side.
Figure 15:
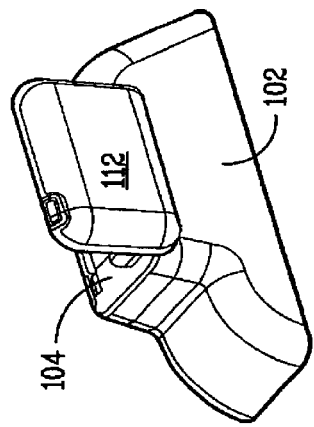
FIG. 15 is a left perspective view of a center console of a vehicle using the ambidextrous lid assembly of the present invention, showing the ambidextrous lid assembly opened from the right or passenger's side.
Figure 14:
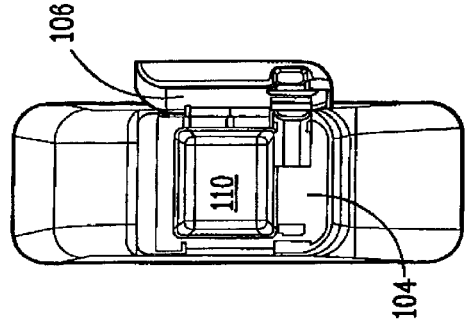
FIG. 14 is a top view of a center console of a vehicle using the ambidextrous lid assembly of the present invention, showing the ambidextrous lid assembly opened from the right or passenger's side.
Figure 13:
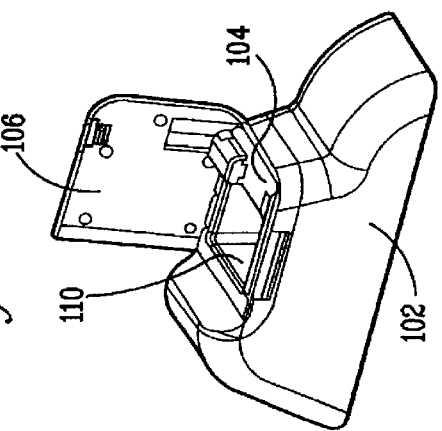
FIG. 13 is a right perspective view of a center console of a vehicle using the ambidextrous lid assembly of the present invention, showing the ambidextrous lid assembly opened from the right or passenger's side.
Figure 18:
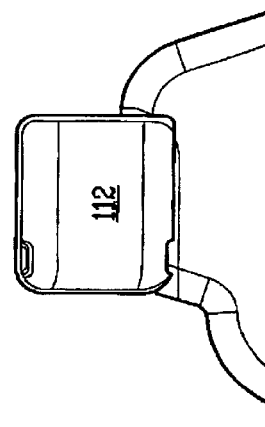
FIG. 18 is a left side view of a center console of a vehicle using the ambidextrous lid assembly of the present invention, showing the ambidextrous lid assembly opened from the right or passengers side.
Figure 17:
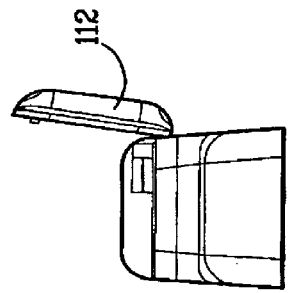
FIG. 17 is a front view of a center console of a vehicle using the ambidextrous lid assembly of the present invention, showing the ambidextrous lid assembly opened from the right or passenger's side.
Figure 16:
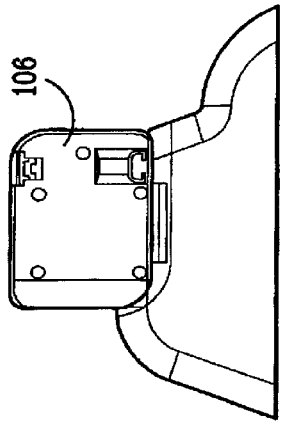
FIG. 16 is a right side view of a center console of a vehicle using the ambidextrous lid assembly of the present invention, showing the ambidextrous lid assembly opened from the right or passenger's side.

Referring to FIGS. 1–28, the present invention is directed to an ambidextrous lid assembly 100 for use with a compartment such as the center console 102 of a vehicle. The center console 102, used for illustrative purposes, is of the type that is positioned between the front seats of a vehicle. The driver normally sits on one side of the console 102 and the front passenger sits on the other side of the console 102. In the illustrative embodiment, the ambidextrous lid assembly is shown configured for vehicles where the driver sits on the left side and the front passenger sits on the right. Naturally, a mirror image of the illustrated lid assembly 100 could be used for vehicles where the driver sits on the right. Although the operation of the lid assembly 100 will be described in the context of providing a closure for the bin of a vehicle console, the lid assembly of the present invention can be applied to a wide variety of other compartments or can be used as a closure wherever ambidextrous operation is desired.

The ambidextrous lid assembly 100 of the present invention, in its basic form includes a first frame member 104 and a second frame member 106. In a preferred embodiment the lid assembly 100 also includes a compartment opening frame 108 which may have, as in the illustrated embodiment, an integral container 110. In addition, the lid assembly 100 may include a lid cover 112 to give the lid assembly 100 an aesthetically pleasing appearance and/or to provide a comfortable armrest. The console 102 is preferably molded in one piece and has a receptacle 114 designed to accommodate the container 110. The perimeter 116 of the opening 114 is shaped to receive and support the third frame member 108. With the third frame member 108 seated on the perimeter 116, the container 110 fits into the receptacle 114. The frame member 108 may be glued or otherwise attached to the console 102 in any well known manner. The compartment opening frame or third frame member 108 is roughly rectangular in plan view and has a relatively large central opening 118 that is contiguous and coextensive with the top opening of the container 110. The frame member 108 has two relief recesses 120 and 122 whose function will be explained later. In addition, the frame member 108 has a pair of depressions 124 and 126. Depression 124 is provided on one side with a ramped edge 128. Located between the depressions 124 and 126 is a receptacle 130 that has different size sections for holding different sized coins. Each end of the recess 120 is provided with a hole 132. Each hole 132 is provided with a lead-in ramp 134 that widens toward the top of the frame member 108.

In the illustrated example, the frame member 108 and the container 110 are integral and form part of the assembly 100. Alternatively, the container 110 can be separate from the frame member 108 and/or be integral with the console 102. Additionally, both the frame member 108 and the container 110 may be integral with the console 102. In the illustrated example, the container 110 defines the interior of the compartment enclosed by the lid assembly 100.

The first frame member 104 is roughly rectangular in plan view and has a relatively large central opening 136 that is designed to register with the top opening of the container 110. In the illustrated example, the opening 136 is sized such that the first frame member 104 covers the coin receptacle 130, thus giving access to the coin receptacle only from the driver's side. The right side of the frame member 104 has a downward extending bracket 138 has a stub shaft 140 at each end. Each stub shaft 140 is snapped into a respective hole 132 using lead-in ramps 134 to pivotally attach the frame member 104 to the frame member 108. Each stub shaft 140 has a ramped end face that cooperates with a respective lead-in ramp 134 to facilitate this attachment process. A second bracket 142 is provided on the left side of the frame member 104. The bracket 142 also extends downward from the bottom of the frame member 104. A stub shaft 144 projects from each end of the bracket 142. Once again the end face of each stub shaft 144 is preferably ramped. A rail 146 is projects from the top surface of the frame member 104. The rail 146 appears mushroom-shaped when viewed from one end as shown in FIG. 21E. The rail 146 has a cavity 148 designed to receive at least in part a coil spring 152. At the closed end of the cavity 148 is a guidepost 150 which passes into one of the spring 152. An open cutout 154 is provided adjacent the left end of the rail 146. A second cutout 156 is provided near the right side of the frame member 104 in line with the rail 146.

Referring to FIGS. 24A–24G, the left button or latching member 158 can be seen. The button 158 has an outer face 160 where finger pressure can be applied by a user to push the button inward. The button 158 has a rear cavity 162 which receives the rail 146 such that the button 158 can move slidably relative to the rail 146. The button 158 has a pair of rails 164 that fit into grooves 170 at the base of the rail 146. The button 158 has a receptacle 168 that receives one end of the spring 152. The spring 152 is positioned between the closed end having the surface 160 of the button 158 and the closed end of the cavity 148. The spring 152 biases the button 158 toward the left of the frame member 104. At the right end of the grooves 170 are recesses 172. Ramped hooks 166, provided at the inner ends of the rails 164, snap into the recesses 172 and limit the outward movement of the button 158. The button 158 has a downward projecting plate 174 which passes through the cutout 154 and extends below the bottom surface of the frame member 104. The plate 174 is provided with a ramped edge 176 which catches the edge 128 of the recess 124 of the frame member 108 to secure the frame member 104 in the closed position. To pivotally move the frame member 104 to the open position, the button 158 must be pushed inward to disengage the edge 176 from the edge 128 to thereby allow the frame member 104 to be pivoted to the open position. With the frame member 106 and the lid cover 112 secured to the frame member 104, this operation is in effect the opening of the lid of the center console compartment from the driver's side of the console, thereby allowing access to the interior of the center console compartment from the driver's side. When closing the lid assembly including frame members 104 and 106 and the lid cover 112 from the driver's side, the ramped surfaces of the edges 176 and 128 cooperate to push the button 158 to the inward open position, thus allowing the frame member 104 to be moved to the closed position. Once the edge 176 clears the edge 128, the spring 152 pushes the button 158 to the outward position, thus bringing the edge 176 into engagement with the underside of the edge 128 to thereby secure the frame member 104, and consequently the rest of the lid assembly, in the closed position.

The frame member 106 has a bracket 178 projecting downward from the left side thereof At each end of the bracket 178 is a flange 180 having a hole 182. The holes 182 are preferably provided with lead-in ramps. The bracket 142 fits between the flanges 180 and the stub shafts 144 snap into the holes 182 to pivotally attach the frame member 106 to the frame member 104. A boss 184 projects upward from the top left surface of the frame member 106 and defines a cavity 186. The cavity 186 receives the button 158 when the frame member 106 is in the closed position, i.e. folded up against the frame member 104. A second boss 188 projects upward from the top right surface of the frame member 106 and defines a cavity 190. The cavity 190 receives the button 192 such that the button 192 can move slidably within cavity 190. A spring 152 is received at least in part in the bore of the receptacle 194 of the button 192. The spring is positioned between the closed left end of the cavity 190 and the receptacle 194, and biases the button 192 toward the outward or latching position. The button 192 has an outer face 196 where finger pressure can be applied by a user to push the button inward to the unlatched position.

Ramped hooks 198 provided at the ends of resilient arms 200, snap into openings 202 in the sides of the cavity 190 and limit outward movement of the button 192.

The button 192 has a downward projecting plate 204 which passes through the cutout 206 at the bottom of the cavity 190 and extends below the bottom surface of the frame member 106. The plate 204 is provided with a ramped edge 210 which catches a ramped edge 208 on the right side of the opening 156 in the frame member 104 to secure the frame member 106 in the closed position against the frame member 104. The opening 156 registers with the depression 126 which provides sufficient clearance for the head 212, defining the ramped surface of the edge 210, of the downward projecting plate 204 such that the frame member 106 can lie flat against the frame member 104 in the closed position. To pivotally move the frame member 106 to the open position, the button 192 must be pushed inward to disengage the edge 210 from the edge 208 to thereby allow the frame member 106 to be pivoted to the open position. With the lid cover 112 secured to the frame member 106, this operation is in effect the opening of the lid of the center console compartment from the passenger's side of the console, thereby allowing access to the interior of the center console compartment from the passenger's side through the opening 136. When closing the lid assembly including frame member 106 and the lid cover 112 from the passenger's side, the ramped surfaces of the edges 210 and 208 cooperate to push the button 192 to the inward open position, thus allowing the frame member 106 to be moved to the closed position. Once the edge 210 clears the edge 208, the second spring 152 pushes the button 192 to the outward position, thus bringing the edge 210 into engagement with the underside of the edge 208 to thereby secure the frame member 106, and consequently the lid cover 112, in the closed position.

The lid cover 112 can be secured to the frame member 106 by any well known means. In the illustrated example, cylindrical receptacles 214 project from the underside 216 of the lid cover 112. The receptacles 214 register with the counter-sunk through holes 218 that allow screws or rivets to be used to fix the lid cover 112 to the frame member 106. If the frame member 106 has cutouts to lighten it and save material, then the lid cover 112 also serves to completely close off the opening of the center console compartment.

The lid assembly including frame members 108, 104, and 106, the lid cover 112, and the container 110 are preferably made of molded plastic, although metal or composites may also be used. The two springs 152 are preferably made of metal.

It is to be understood that the present invention is not limited to the embodiments described above, but encompasses any and all embodiments within the scope of the following

We claim:

1. A lid assembly for providing a closure for an opening of a compartment, the lid assembly comprising:
   a first frame member adapted for pivotal attachment proximate the compartment opening, said first member defining a frame opening, said first frame member being pivotally movable between a first closed position and a first open position relative to the compartment opening when the first frame member is pivotally attached proximate the compartment opening, said frame opening registering with the compartment opening at least in part when said first frame member is in said first closed position;
   a first latch assembly supported by said first frame member, said first latch assembly being adapted to selectively secure said first frame member in said first closed position;

a second frame member pivotally attached to said first frame member, said second frame member being movable between a second closed position and a second open position relative to said first frame member;

a second latch assembly supported by said second frame member, said second latch assembly being adapted to selectively secure said second frame member in said second closed position; and a third frame member adapted to surround the opening of the compartment, said first frame member being pivotally connected to said third frame member.

2. A lid assembly according to claim 1, wherein said first frame member has a first pair of stub-shafts and said second frame member has a pair of flanges, each of said pair of flanges having a hole, and wherein each of said first pair of stub-shafts engages said hole of a respective one of said pair of flanges to pivotally connect said first frame member to said second frame member.

3. A lid assembly according to claim 2, wherein said second latch assembly comprises:

a second button slidably supported by said second frame member, said second button being movable between open and closed positions, said second button being biased toward said closed position, said second button having an outer face where finger pressure can be applied by a user to push said second button toward said open position, said second button having a downward projecting plate provided with a ramped edge which catches a surface of said first frame member to secure said second frame member in said closed position thereof relative to said first frame member.

4. A lid assembly according to claim 3, further comprising:

a lid cover attached to said second frame member and adapted to provide an armrest.

5. A lid assembly according to claim 3, wherein said third frame member has two holes, and wherein each of said second pair of stub-shafts engages a respective one of said two holes of said third frame member to pivotally connect said first frame member to said third frame member.

6. A lid assembly according to claim 5, wherein each of said two holes of said third frame member is provided with a lead-in ramp that allows said second pair of stub shafts to snap into said respective one of said two holes of said third frame member.

7. A lid assembly according to claim 5, wherein said first latch assembly comprises:

a first button slidably supported by said first frame member, said first button being movable between open and closed positions, said first button being biased toward said closed position thereof, said first button having an outer face where finger pressure can be applied by a user to push said first button toward said open position, said first button having a downward projecting plate provided with a ramped edge which catches a surface of said third frame member to secure said first frame member in said closed position thereof relative to the opening of the compartment.

* * * * *